United States Patent [19]
Doan

[11] Patent Number: 5,564,888
[45] Date of Patent: Oct. 15, 1996

[54] PICK AND PLACE MACHINE

[76] Inventor: Carl V. Doan, 20 Daytona St., Nashua, N.H. 03060

[21] Appl. No.: 126,986

[22] Filed: Sep. 27, 1993

[51] Int. Cl.⁶ ................................................ B66C 1/00
[52] U.S. Cl. .................................. 414/751; 414/738
[58] Field of Search ........................ 414/733, 730, 414/782, 753, 783, 752, 751, 749, 738

[56] References Cited

U.S. PATENT DOCUMENTS

Re. 18,133  7/1931  Westin .................................. 414/733
2,948,417  8/1960  Haanes ................................. 414/733
4,574,941  3/1986  Tsuge et al. ...................... 414/733 X Primary Examiner—Donald W. Underwood

[57] ABSTRACT

An improved pick and place machine works together with a part holding device to pick and lift a part out of a first station, shift to a second station, descend and release the part. An unique linkage system converts simple reciprocating motion from a fluid cylinder or the like into an inverted U-shape motion, providing a smooth, controlled acceleration, deceleration motion for the holding device. The machine has a carriage which is held upright by a sliding lever and which having a box shape, rum outside of a body enabling the part holding device to be mounted on the carriage.

8 Claims, 3 Drawing Sheets

PICK AND PLACE MACHINE

BACKGROUND

FIELD OF THE INVENTION

This invention relates to a device capable of picking a part from a first station and thereafter placing and releasing such part in a second station. Such devices are commonly use in automation applications and called "pick and place mechanisms."

Mechanisms of this general type normally include a part holding device mounted on a pick and place machine's carriage, being adaptive to lift, then, shift from a first station to a second station, then, descend. First, parts are gripped by the part holding device, then (1)lifted up, (2)shifted to second location, and (3)descended, the part holding device then releases the part. Motions (1)(2)(3) are provided by the pick and place machine. The part holding device could be a suction cup, an electromagnet or a gripper. Depending upon part orientation at the first and second stations, the axis of motions(1) and (3) could be parallel or angular with each other.

BACKGROUND

DESCRIPTION OF PRIOR ART

There are a number of pick and place machines now on the market; mainly, those are cam driven and hydraulic/pneumatic driven and servo motor/stepper motor driven.

Cam driven machines offer the smoothest motion and control of acceleration and deceleration. They can run at high cyclic rate, however, they are big, heavy and not suitable for applications where space is limited.

Hydraulic/pneumatic driven machines are more compact and easier to use, but because they usually use hydraulic/pneumatic pressure to drive the components against hard stops, they create impact and result in noisy machines of low cyclic rate.

Servo motor/stepper motor driven machines are usually slower, higher in cost, serving the market with flexible/programmable pick up and placing points when required.

Example of device of this general nature may be found in the following U.S. Pat. Nos. 4,095,699: 3,655,070: 3,521,760: 3,803,944: 2,670,983: 3,507,403:! 3,397,799: 3,865,253: 3,647,090: 3,910,423: 3,921,820: 3,921,822.

OBJECTIVES AND ADVANTAGES

Several objects and advantages of the present invention are:

(a) to provide a pick and place machine which is compact.

(b) to provide a pick and place machine which simplifies power input requirements, one fluid cylinder or similar mechanical or electrical means.

(c) to provide a pick and place machine with smoother motion, acceleration as well as deceleration.

This invention, employs a hydraulic/pneumatic cylinder to power the carriage through a linkage system, causing the carriage to accelerate smoothly from stop/decelerate smoothly to stop thus reduce the noise and allow the machine to run at higher speed while keeping the machine in a small, compact envelope.

Still, further objects and advantages will become apparent from a consideration of the ensuing description and drawing.

DESCRIPTION OF DRAWINGS

FIG. 4A illustrates orthogonal guidance using an X and Y slide. FIG. 4B illustrates orthogonal guidance using parallel linkage. FIG. 4C illustrates orthogonal guidance using an X slide and parallel linkage.

FIG. 5A illustrates non-linear guidance using a slide mounted on a pivot block. FIG. 5B illustrates non-linear guidance using a slider with a slot, a stationary pin and a side guide.

SUMMARY OF THE INVENTION

Figure 1:
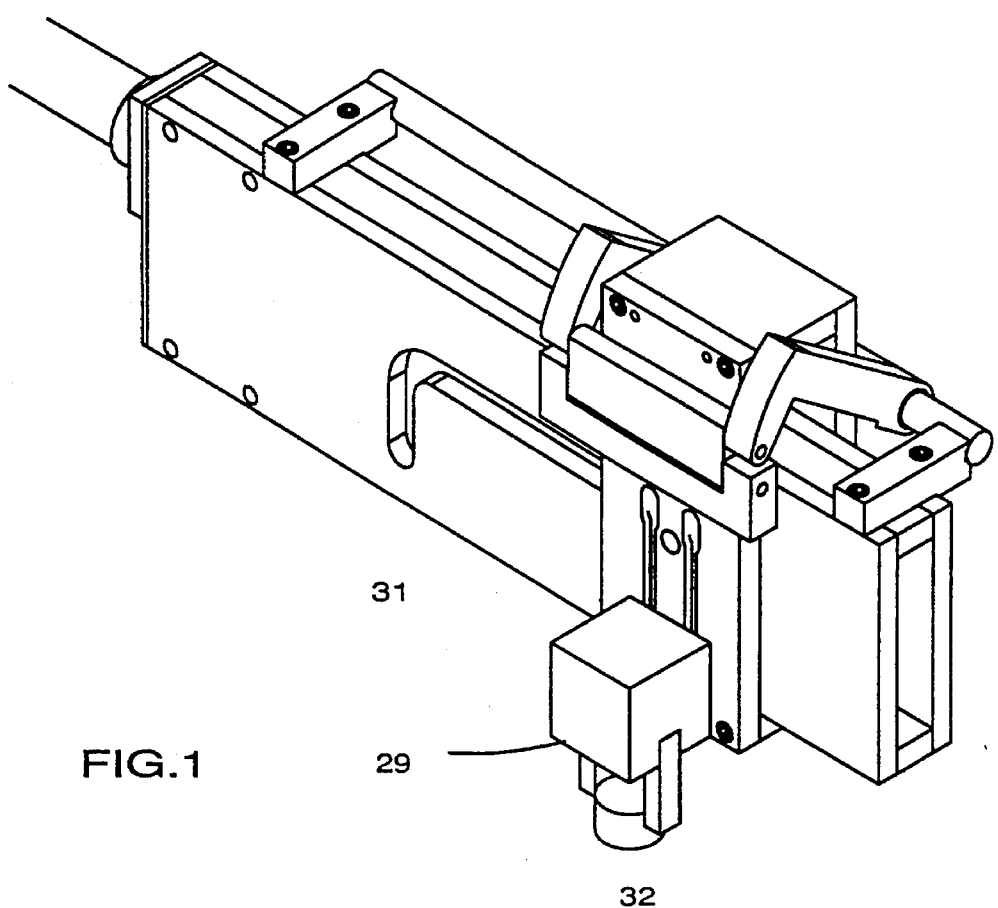
FIG. 1 is the isometric view of the pick and place machine.
Figure 3:
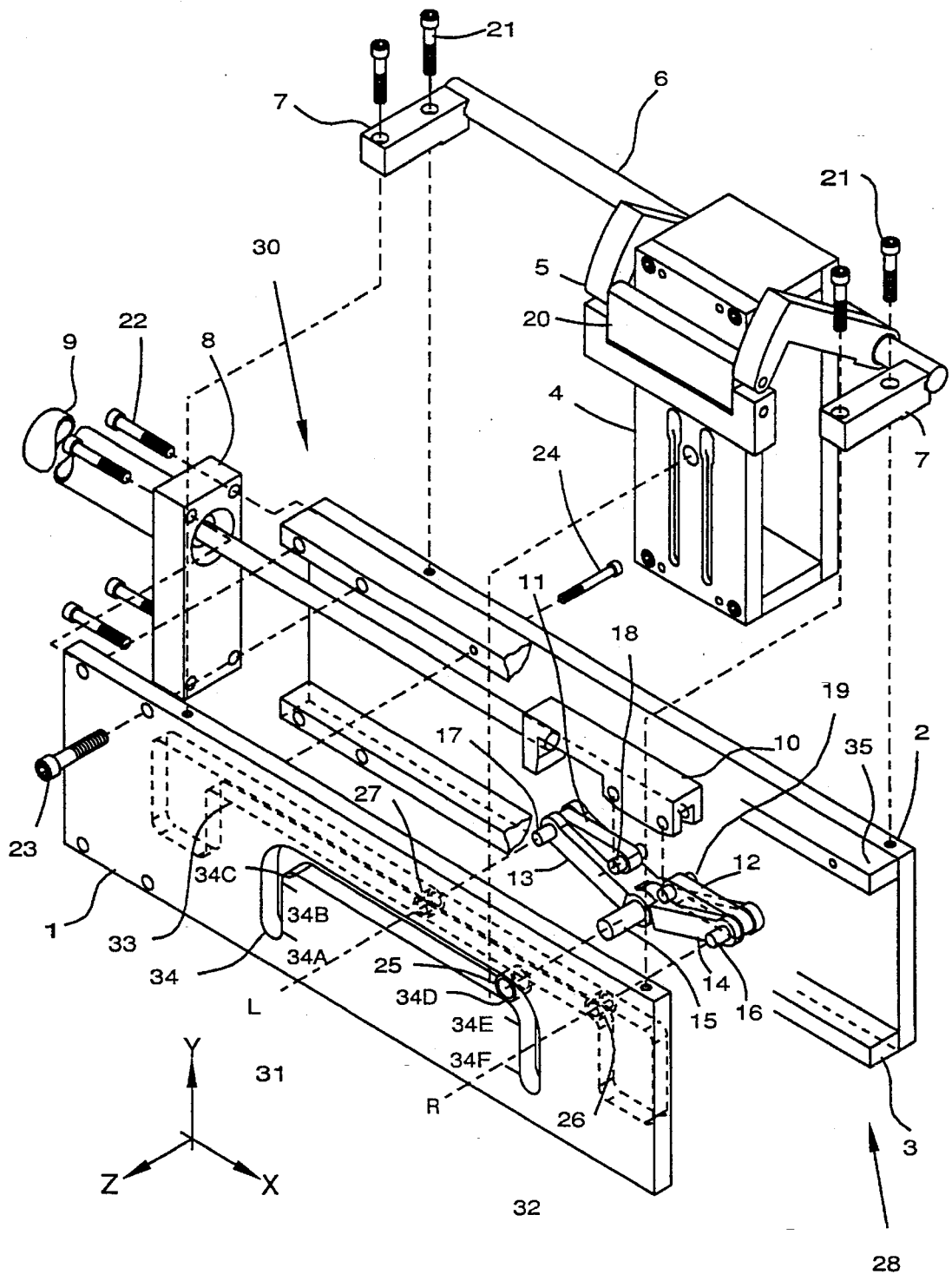
FIG. 3 is the exploded view of the pick and place machine.
Figure 4A:
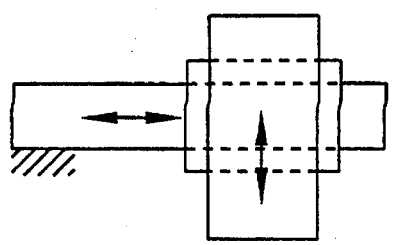
FIGS. 4A–4C illustrate various designs of orthogonal guidance.
Figure 4B:
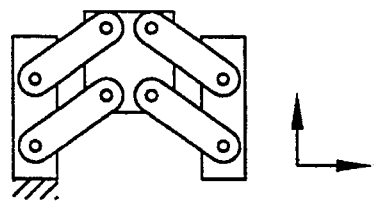
Figure 4C:
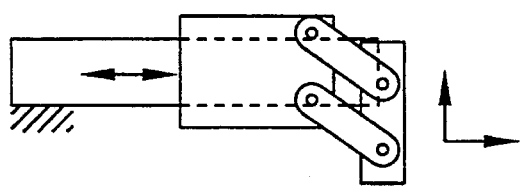
Figure 5A:
FIGS. 5A–5B illustrate various designs of non-linear guidance.
Figure 5A:
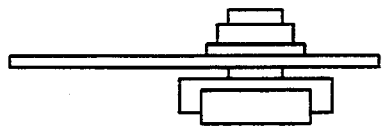
Figure 5A:
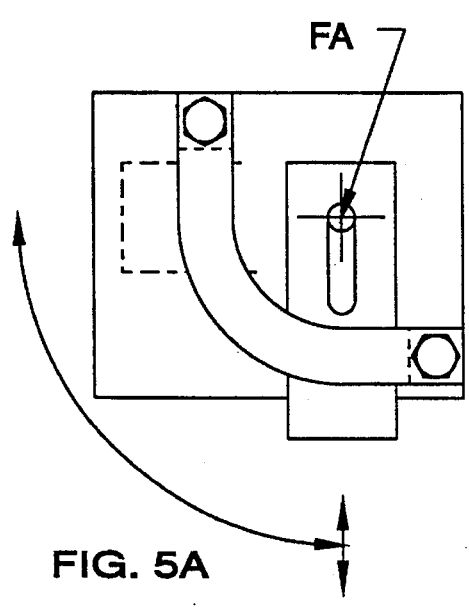
Figure 5B:
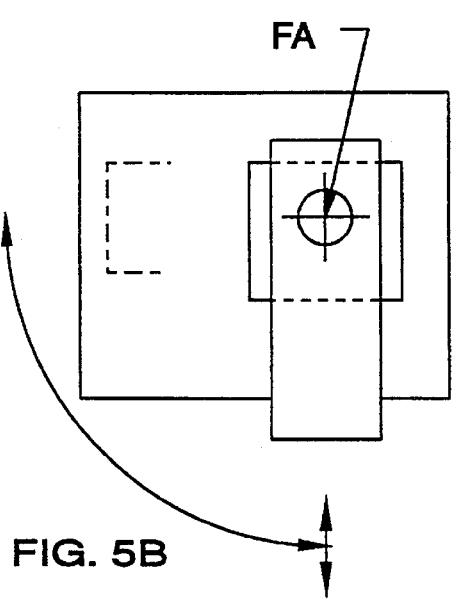

With reference to FIG. 1 and FIG. 3, the pick and place device 30 of the present invention is shown in a mode disposed to pick up a part from the first station 31 indicated to the upper left, and deliver it to the second station 32 indicated to the lower fight. The first and second stations could obviously be interchangeable.

The device 30 includes a main plate 1 positioned generally in a vertical attitude, which is joined to the rear plate 2 by joining screw 24, spacer 3 and 35, together they (1,2,3, 35) form a body 28 in a box configuration and are supported by means of a bracket(not shown) to its owns support or mounted to another machine member by mounting screw 23.

A carriage assembly 4 rides over the body 28, and is connected to a link 20 which is inturn connected to sliding lever 5, which inturn slides and/or swings around shaft 6, which inturn is mounted to a pair of shaft holders 7, which inturn mounts to the body 28. Sliding lever 5 can only slide along or swing around shaft 6 but is constrained from twisting around a Z axis by shaft 6. This constraint is transmitted to carriage assembly 4 by links 20. Therefore, carriage 4 can only move orthogonally along X and Y axes but is prevented from twisting in any axis. Inserted into carriage 4 is a pin 15, which inturn rides in a cam follower 25, which inturn rides in a cam track 34. This further constrains carriage 4; it only moves orthogonally to the path described by cam track 34.

With reference to FIG. 3, a fluid cylinder 9 connects to a top link 10, which inturn connects to a pin 18 and a pin 19, which are inturn connected to an upper left link 11 and an upper right link 12 respectively, which inturn are connected to a left lower link 13 and a right lower link 14, respectively, at axes L and R, respectively, by a left linkage pin 17 and a right linkage pin 16 respectively, which inturn rides on a camfollower 27 and a camfollower 26 respectively, which inturn rides on cam track 33. Other ends of links 13 and 14 are joined together by pin 15.

From position 34C to position 34D (position where pin 15 aligns with 34C to position which pin 15 aligns with 34D, see FIG. 3), power is transmitted from fluid cylinder 9 to upper link 10 then to link 11 and 12, then to links 13 and 14, then to pin 15, then to carriage 4, at this part of the cycle, the carriage moves at the same speed as top link 10. As the fluid piston continues moving forward, at position 34D, cam track 33 allows cam follower 26 to drop and cam track 34 drives pin 15 down, thus causing left lower link 13 to rotate clockwise around pin 17 as it moves forward without conflict in the five bar link system.

From position 34D to 34E, link 13 continuously rotates clockwise. This motion causes pin 15 and inturn the carriage, to lag behind in speed that of top link 10 in the X direction. Thus, the rotation of link 13 decelerates pin 15 (inturn, the carriage) in the X direction while accelerates pin 15 (inturn, the carriage) in the negative Y direction. At position 34E, the speed of pin 15 comes to zero in the X direction.

From position 34E to 34F, the speed of pin 15 stays at zero in the X direction, pin 15 continuous to accelerate in the negative Y direction until link 13 is at 45 degree from horizontal. From here, pin 15 decelerates to stop at position 34F.

In reverse cycle, the carriage returns along the track to the origin with acceleration and deceleration functions of the cam section being reversed.

A gripper 29 (see FIG. 1) is mounted onto the carriage to grip parts.

Figure 2:
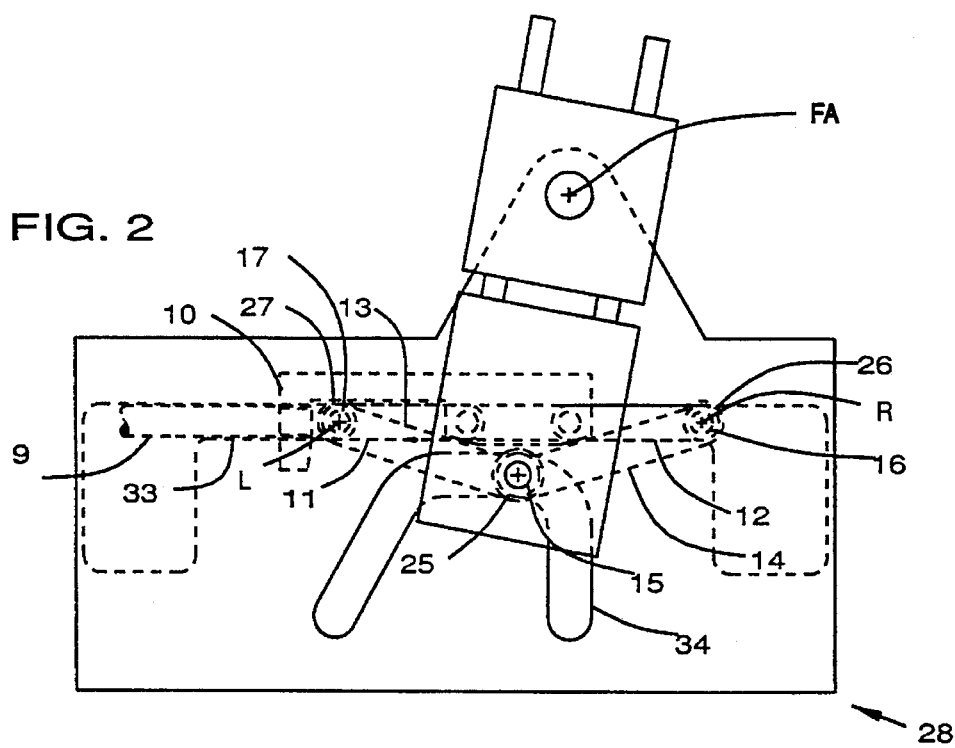
FIG. 2 is the side view of an angular pick and place which employs a similar linkage system in conjunction with inverted U-track slot where the pick axis is not parallel with the place axis. Non-linear guidance is used instead of orthogonal guidance.

FIG. 2 shows a side view of an angular pick and place using similar linkage system, working with inverted U-shape slot, in which, initial and terminal straight portions form an angle. Non-linear guidance is used here instead of orthogonal, otherwise, the function is similar to that of FIG. 1 and FIG. 3.

SUMMARY, RAMIFICATIONS, AND SCOPE

Accordingly, the reader will see that the invention of this pick and place is a significant improvement over current designs, it offers smoother motion, easy control, and high cyclic rate in a compact package. The use of T slots and T nuts instead of tapped holes offers another convenient feature for mounting the part holding device.

Although the description above contains many specificities, these should not be construed as limits of scope of the invention but as merely providing illustrations of some of the presently preferred embodiments of this invention.

Thus the scope of the invention should be determined by the appended claims and their legal equivalents, rather than by the example given.

I claim:

1. A pick and place machine operable to pick up and lift a part out of a first station, move a predetermined distance, descend to place and release the part at a second station, comprising:
    a. a top link (10) having two ends which reciprocates within predetermined stroke limits
    b. a right upper link (12) having two ends and pivotally mounted at one end to one end of said top link (10)
    c. a right lower link (14) having two ends pivotally mounted at one end to the other end of said right upper link (12) at an axis R
    d. a left upper link (11) having two ends and pivotally mounted at one end to the other end of said top link (10)
    e. a left lower link 13 having two ends and pivotally mounted at one end to the other end of said left upper link (11) at an axis L
    f. a first follower (27) connected to said left lower link (13) and said left upper link (11) in the proximity of the axis L
    g. a second follower (26) connected to said right lower link (14) and said fight upper link (12) in the proximity of the axis R
    h. a first cam track (33) with a generally straight portion
    i. said first follower (27) follows said first cam track (33)
    j. said second follower (26) follows said first cam track (33)
    k. a second cam track (34) having initial and terminal straight vertical portions interconnected by an approximately horizontal portion
    l. a third follower (25) follows said second cam track (34)
    m. a body (28)
    n. a guided carriage
    o. said third follower (25) connected to said guided carriage
    p. said guided carriage slidable mounted on said body (28), and an orthogonal guidance means connected between the carriage and the body, whereby said carriage can translate, in an X Y plane but is prevented from tilting at any axis, and with a motion path determined by said second cam track (34) by means of said third follower (25)
    q. the other end of said right lower link (14) pivotally mounted onto said guided carriage
    r. the other end of said left lower link (13) pivotally mounted onto said guided carriage
    s. said guided carriage includes a part holding means thereon, and actuation means to respectively grasp and release said part in said first and said second station in response to the movement of said guided carriage
    t. an actuator means connected to the top link reciprocates the top link and moves the followers in the tracks.

2. The machine of claim 1, wherein said body is constructed of a front plate 1, a rear plate 2 and two spacers 3 and 35 positioned between the plates.

3. The machine of claim 1, wherein said orthogonal guidance means comprising:
    a. a shaft attach to said body by an attaching means
    b. a lever mounted slidable along and swingable about said shaft, whereby it is constrained from tiring about a Z axis
    c. a link joining said lever and said guided carriage
    d. said carriage slidable on said body, whereby it is constrained form tilting about X and Y axes comprising the XY plane, said lever and said link further constrain said carriage from tilting about the Z axis, while the carriage is still slidable in the XY plane.

4. The machine of claim 1, wherein said cam track 34 is in the form of an inverted U-shape.

5. A pick and place machine operable to pick up and lift a part out of a first station, swing a predetermined angle, descend down and place and release the part at a second station, comprising:
    a. a top link (10) having two ends which reciprocates within predetermined stroke limits
    b. a right upper link (12) having two ends and pivotally mounted at one end to one end of said top link (10)
    c a right lower link (14) having two ends pivotally mounted at one end to the other end of said right upper link (12) at an axis R
    d. a left upper link (11) having two ends and pivotally mounted at one end to the other end of said top link (10)
    e. a left lower link (13) having two ends and pivotally mounted at one end to the other end of said left upper link (11) at an axis L f. a first follower (27) connected to said left lower link (13) and said left upper link (11) in the proximity of the axis L g. a second follower (26) connected to said right lower link (14) and said right upper link (12) in the proximity of the axis R h. a first cam track (33) with a generally straight portion i. said first follower (27) follows said first cam track (33)

j. said second follower (26) follows said first cam track (33)

k. a second cam track (34) having initial and terminal straight portions which form an angle interconnected by curves portion l. a third follower (25) follows said second cam track (34)

m. a body n. a guided carriage o. said third follower (25) connected to said guided carriage p. said guided carriage slidable and pivotable mounted on said body, and a non-linear guidance means connected between the carriage and the body, whereby said carriage can swing about a fixed axis FA, slidable toward/away from said fixed axis but constrained from tilting on any other axis, and with a motion path determined by said second cam track (34) by means of said third follower (25)

q. the other end of said fight lower link (14) pivotally mounted to said guided carriage r. the other end of said left lower link (13) pivotally mounted to said guided carriage s. said guided carriage includes a part holding means thereon, and actuation means to respectively grasp and release said part in said first and said second station in response to the movement of said guided carriage t. an actuator means connected to the top link reciprocates the top link and moves the followers in the tracks.

6. The machine of claim 5, wherein said non-linear guidance means comprising:

a. a pivot lever pivotally and suitably mounted to said body by an attaching means b. said carriage suitably mounted to said lever.

7. A linkage system to convert single axis motion into generally inverted motion, suitable to be used in pick and place machine, comprising:

a. a top link (10) having two ends which reciprocates within predetermined stroke limits b. a right upper link (12) having two ends and pivotally mounted at one end to one end of said top link (10)

c. a right lower link (14) having two ends pivotally mounted at one end to the other end of said right upper link (12) at an axis R d. a left upper link (11) having two ends and pivotally mounted at one end to the other end of said top link (10)

e. a left lower link (13) having two ends and pivotally mounted at one end to the other end of said left upper link (11) at an axis L f. a first follower (27) connected to said left lower link (13) and said left upper link (11) in the proximity of the axis L g. a second follower (26) connected to said right lower link (14) and said right upper link (12) in the proximity of the axis R h. a first cam track (33) with a generally straight portion i. said first follower (27) follows said first cam track (33)

j. said second follower (26) follows said first cam track (33)

k. a second cam track (34) having initial and terminal straight vertical portions interconnected by an approximately horizontal portion l. a third follower (25) follows said second cam track (34)

m. the other end of said right lower link (14) pivotally mounted onto said third follower (25)

n. the other end of said left lower link (13) pivotally mounted onto said third follower (25)

o. output is attainable at said third follower (25)

p. an actuator means connected to the top link reciprocates the top link and moves the followers in the tracks.

8. The linkage system of claim 7, wherein said second cam track (34) is in the form of an inverted U-shape.

* * * * *